April 21, 1959  T. H. KÜMMICH ET AL  2,883,020
SHIFTING DEVICE FOR CLAW CLUTCHES
Filed Sept. 29, 1953
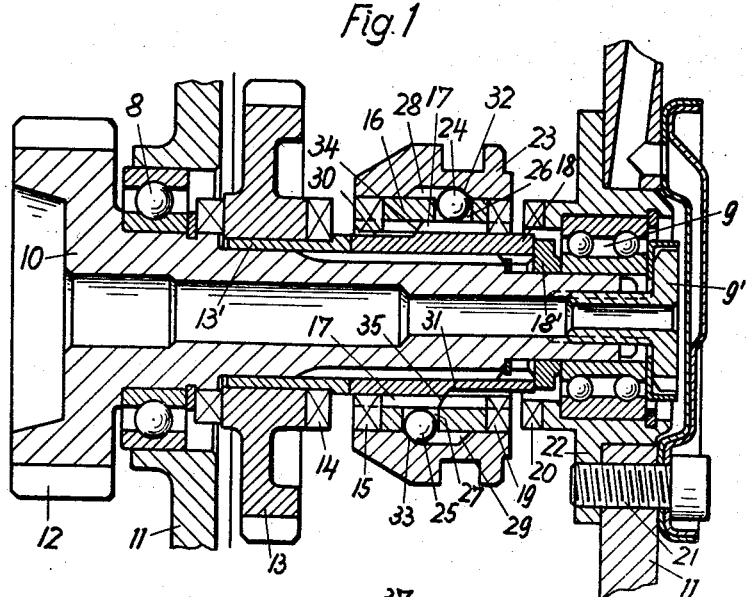
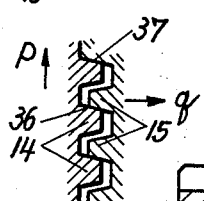
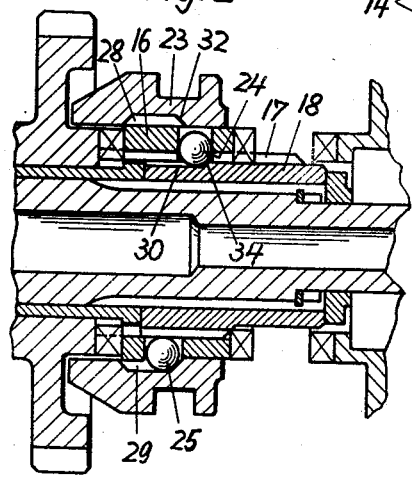
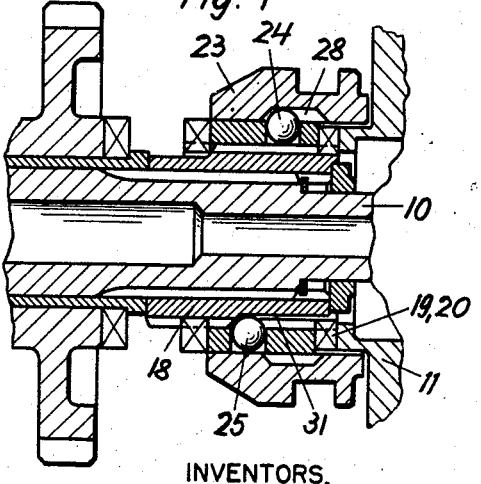
INVENTORS,
THEODOR F. KÜMMICH, DECEASED,
BY MARIA K. KÜMMICH, ADMINISTRATOR,
AND FRITZ GRABOW
BY  *Dicke and Craig.*
ATTORNEYS.

United States Patent Office 2,883,020
Patented Apr. 21, 1959

2,883,020

SHIFTING DEVICE FOR CLAW CLUTCHES

Theodor F. Kümmich, deceased, late of Stuttgart, Germany, by Maria K. Kümmich, administrator, Stuttgart, and Fritz Grabow, Stuttgart-Unterturkheim, Germany, assignors to Daimler-Benz Aktiengesellschaft, Stuttgart-Unterturkheim, Germany Application September 29, 1953, Serial No. 383,082

Claims priority, application Germany October 2, 1952

12 Claims. (Cl. 192—18)

This invention relates to a shifting device for claw clutches and more particularly to such a one adapted for use in connection with change speed gears with interposed fluid couplings.

An object of the present invention is to provide a clutch shifting device including novel and improved means so designed as to overcome the impediment in shifting caused by the residual moment which exists also in fluid couplings under no-load condition and which is primarily noticeable in constructions wherein engagement of the fluid coupling is not accomplished by the employment of friction or slipping clutches but by positively engageable clutches such as, for example, claw clutches. Along with this, the impediment exists not only upon engagement of the claw clutch but owing to the occurring frictional force also upon their disengagement.

Another object of the present invention is the provision of means securing a more positive engagement of claw clutches and to prevent their unintentional disengagement under the action of axial forces, especially with the use of beveled claws.

An important feature of the present invention consists accordingly in that the claws are beveled in such a manner that an axial component of a force acting toward disengagement is produced with an engaged clutch, that provision is made for a locking device for the slidable claw-clutch member by means of which it is positively held in engagement and by means of which axial components of a force are absorbed to thereby relieve the claw clutch and to thereby disable disengagement of the claw clutch so as to prevent the unintentional disengagement thereof.

In particular there are provided for this purpose special locking members which lock the slidable claw-clutch member during engagement thereof by means of a separately slidable clutch or control sleeve against the associated shaft.

A further object of the invention is the application of this principle to a double change speed gear device, particularly for shifting a reverse gear and a parking lock-up in an especially simple and practical construction well adapted for the purpose for which the same is intended.

For this purpose there are preferably provided at least two locking members of which one is used for locking the one claw engagement and the other one for locking the other claw engagement. At the same time they may serve as means for limiting the travel of the clutch sleeve in the specific shifting direction associated with the respective other locking member and as disengaging means.

Other objects and features of the invention will become apparent from the following description taken in connection with the accompanying drawings which illustrate a preferred embodiment of the invention. In the drawings:

Fig. 1 is a longitudinal sectional view through the claw clutch formed as a change-over clutch, showing it in mid position, Fig. 2 is a view similar to Fig. 1 with a few parts omitted but showing the left-hand claws in engagement for shifting a reverse gear for example, Fig. 3 is a view showing the claws in partly engaged position, and Fig. 4 is a view similar to Fig. 2 but showing the right-hand claws in engagement, for example, for establishing a parking lock-up.

In the various views of the drawing the numeral 10 indicates a main or counter shaft, particularly a layshaft, for a motor vehicle transmission supported by means of ball bearings 8 and 9 in a housing 11 and provided with a gear wheel 12. A gear wheel 13 for a reverse gear is freely rotatably but non-slidably mounted by means of a sleeve 13' upon the shaft 10. This gear wheel 13 is in continuous mesh with a counter gear wheel (not shown). It is provided with claws 14 which can be brought into engagement with corresponding counter claws 15 of a claw-clutch member 16. The latter is axially slidable by means of splines 17 upon a sleeve 18 which is rigidly secured upon the shaft 10 and axially supported on the ball bearing 9 by a thrust collar 18'. It is further provided with claws 19 which can be brought into engagement with counter claws 20 of a hub 22 fastened by means of screws 21 to the housing 11. The ball bearing 9 is held in place upon the shaft 10 by a threaded member 9'.

A further clutch member 23 formed as clutch or control sleeve is slidably arranged upon the cylindrical perimeter of the claw-clutch member 16, the slidability being, however, limited by the balls 24 and 25 acting as locking members. The latter are arranged in radial bores 26 and 27 respectively of the claw-clutch member 23, yet so proportioned as to project inwardly or outwardly over the bores and thereby engage either the longitudinal grooves 28 and 29 (Fig. 1) of the clutch sleeve 23, or the longitudinal grooves 30 and 31 respectively of the sleeve 18 when shifted to the left (Fig. 2) and to the right (Fig. 4) respectively. The balls are so staggered axially as to each other that in the mid-position, the ball 24 is in abutting engagement with the beveled right-hand end 32 of the longitudinal groove 28, and the ball 25 is in abutting engagement with the beveled left-hand end 33 of the longitudinal groove 29. Further, the ends of the grooves 30 and 31 are beveled at 34 and 35. Fig. 3 shows also the beveling 36 and 37 of the claws 14 and 15. The claws 19 and 20 are correspondingly beveled also.

The principle of operation of the described device is the following: Fig. 1 shows the clutch in its neutral midposition. The balls 24 and 25 are in engagement with the grooves or recesses 28 and 29 of the clutch sleeve 23, yet are secured against inward displacement by the splines 17 on the sleeve 18. Hence, on shifting the clutch sleeve 23 leftward, the clutch sleeve carries by means of the ball 24 the claw member 16 with it until the claws 15 engage the claws 14 and hence the reverse gear. In this position (Fig. 2) the ball 24 can enter the recess 30, which, for example, is formed by a correspondingly milled off portion of the spline 17 on the sleeve 18, and is then urged into the recess by the bevel 32. Hereupon the clutch sleeve 23 can be further shifted until it reaches the left-hand end position represented in Fig. 2. The ball 24 is thereby prevented from leaving or secured in the recess 30. The thrust force, which owing to the bevels 36 and 37 on the claws 14 and 15, occurs in the axial direction $q$ when a driving force is effective in the circumferential direction $p$, is at the same time transmitted by the shoulder 34 to the shaft, whilst only a radial pressure, corresponding to the bevel 34, is effective upon the clutch sleeve, which, however, is incapable of producing a component of a force in the disengaging direction. By abutting against the right-hand end of the longitudinal groove 29, the ball 25 limits also the axial travel of the clutch sleeve 23.

For disengagement, the clutch sleeve 23 is first of all shifted to the right, clutch engagement being maintained by the claw member 16 so long until the recess 28 is over the ball 24. At the same time the ball 25 reaches the left-hand end of the longitudinal groove 29, so that on further shifting of the clutch sleeve 23, the claw member 16 is positively carried along by the ball 25, in that at the same time the ball 24 is urged upwardly on the bevel 34 into engagement with the longitudinal groove 28. Disengagement of the claws 14 is secured in a positive manner by the interaction of face 33 with the ball 25 and is facilitated by the beveled shape 36 and 37 of the claws 14 and 15, since the force acting in the circumferential direction $p$ produces an axial component in direction $q$ which causes the claws to be disengaged more easily.

A corresponding mode of operation results when the clutch sleeve 23 is shifted to the right in conformity to Fig. 4. In this case the ball 24 remains in engagement with the longitudinal groove 28, whilst the ball 25 enters the recess 31 in the sleeve 18 and is locked by the clutch sleeve 23 on further displacement thereof. By the engagement of the claws 19 and 20 with each other the shaft 10 is rigidly coupled with the housing 11. Hence, the principle of operation of the balls 24 and 25 is just the opposite as in the previously described engagement of the reverse gear.

It will be obvious that various modifications may be made in the embodiment above described without in any way departing from the spirit of the invention as defined in the claims.

What is claimed is:

1. A shifting device for a motor vehicle transmission comprising a shaft, a sleeve having internal splines rigidly secured to said shaft against axial and rotative movement relative thereto, said sleeve being provided with external splines and shoulder means, a first element having said shaft concentrically disposed therein, said element having claw means on one side thereof, a second element in driving connection with said sleeve and axially movable thereon, said second element having claw means complementary to said first claw means and having radial bore means therein, clutch element means partially disposed in said radial bore means, and sleeve means having a substantially cylindrical surface slidable upon said second element, said sleeve means having groove means disposed therein and opposite said radial bore means for receiving said clutch element means, said sleeve means being operative upon said second element for urging said claw means of said second element into and out of engagement with said claw means of said first element, one of said clutch element means being disposed in one of said groove means and in one of said radial bore means for maintaining a driving connection therebetween, and one of said clutch element means partially disposed in one of said radial bore means being urged into engagement with said shoulder means on said sleeve and out of engagement with said groove means during engagement of said first claw means with said second claw means.

2. A shifting device as set forth in claim 1, wherein said groove means extend axially of said sleeve means and said groove means are beveled at both ends thereof.

3. A shifting device as set forth in claim 1, wherein said first element is a gear wheel for a reverse gear in said motor vehicle transmission.

4. A shifting device as set forth in claim 1, wherein said sleeve has short longitudinal groove segment means therein disposed between the external splines thereof for receiving said clutch element means when said first claw means and said second claw means are engaged.

5. A shifting device as set forth in claim 1, wherein said second element comprises an internally splined bushing having a cylindrical outer surface.

6. A shifting device as set forth in claim 1, wherein said radial bore means comprise a plurality of radial bores and said clutch element means comprise an equal plurality of balls, one each of said bores receiving one each of said balls.

7. A shifting device as set forth in claim 1, wherein said second element is in the form of a sleeve, the radial thickness of said sleeve being less than the radial thickness of said claw means complementary to said first claw means.

8. A shifting device as set forth in claim 1, wherein said second element is provided with splines cooperating with said external splines on said sleeve, said claw means of said second element being in the form of a ring having an inner diameter substantially equal to the root diameter of said external splines on said sleeve.

9. A shifting device for a motor vehicle transmission comprising a shaft, a member fixed to said shaft and comprising a first shoulder means, a second shoulder means, a first spline means and a second spline means, a shiftable means having an intermediate position and comprising a first element rotatably mounted on said shaft and having a first claw means, a second element coaxial with said shaft and having a second claw means, a third element having spline means engaging said first and second spline means and axially slidable thereon, said third element having claw means engageable with said first or second claw means respectively upon axial sliding movement of said third element, said third element being provided with first and second radially movable clutch elements, a sleeve member slidable upon said third element and having grooves therein, each of said radially movable clutch elements engaging the wall of one of said grooves and being free of shoulder means engagement when said shiftable means is in said intermediate position.

10. A shifting device according to claim 9, wherein when said claw means on said third element is in engagement with said first claw means, said first clutch element is free of engagement with the wall of one of said grooves and in engagement with said first shoulder means.

11. A shifting device according to claim 10, wherein when said claw means on said third element is in engagement with said first claw means, said second clutch element is in engagement with the wall of one of said grooves and free from shoulder means engagement.

12. A shifting device for a motor vehicle comprising a shaft having thereon a member having a groove therein blocked at one end by a shoulder, a first element having said shaft concentrically disposed therein, said first element having a first claw means on one side thereof, a second element having a driving connection with said member and axially movable thereon, said second element having second claw means complementary to said first claw means and having radial bore means therein, clutch element means partially disposed in said radial bore means, and sleeve means having a substantially cylindrical surface slidable upon said second element, said sleeve means having groove means disposed therein and opposite said radial bore means for receiving said clutch element means, said sleeve means being operative upon said second element for urging said second claw means into and out of engagement with said first claw means, one of said clutch element means being disposed in one of said groove means and in one of said radial bore means for maintaining a driving connection therebetween, and one of said clutch element means partially disposed in one of said radial bore means being urged into engagement with said shoulder and out of engagement with said groove means during engagement of said first claw means with said second claw means.

References Cited in the file of this patent

UNITED STATES PATENTS

| | | |
|---|---|---|
| 1,379,891 | Aichele | May 31, 1921 |
| 1,462,879 | Woodward | July 24, 1923 |
| 2,459,361 | Carnagua et al. | Jan. 18, 1949 |
| 2,639,013 | Meschia | May 19, 1953 |
| 2,735,528 | Dodge | Feb. 21, 1956 |
| 2,787,355 | Dodge | Apr. 4, 1957 |
| 2,801,721 | Dodge | Aug. 6, 1957 |

FOREIGN PATENTS

| | | |
|---|---|---|
| 86,613 | Switzerland | Sept. 16, 1920 |
| 408,608 | Italy | Jan. 4, 1945 |